US008660939B2

(12) United States Patent
Allen et al.

(10) Patent No.: US 8,660,939 B2
(45) Date of Patent: Feb. 25, 2014

(54) METHOD FOR MORTGAGE CUSTOMER RETENTION

(76) Inventors: Timothy D. Allen, Naples, FL (US); Edward Wollman, Naples, FL (US)

( * ) Notice: Subject to any disclaimer, the term of this patent is extended or adjusted under 35 U.S.C. 154(b) by 2341 days.

(21) Appl. No.: 09/858,384

(22) Filed: May 16, 2001

(65) Prior Publication Data

US 2001/0044772 A1 Nov. 22, 2001

Related U.S. Application Data

(60) Provisional application No. 60/204,853, filed on May 17, 2000.

(51) Int. Cl.
*G06Q 40/00* (2012.01)

(52) U.S. Cl.
USPC .......................................................... 705/38

(58) Field of Classification Search
USPC .......................................................... 705/35
See application file for complete search history.

(56) References Cited

U.S. PATENT DOCUMENTS

| | | | |
|---|---|---|---|
| 4,648,038 A | 3/1987 | Roberts et al. | |
| 4,750,119 A | 6/1988 | Cohen et al. | |
| 4,752,877 A | 6/1988 | Roberts et al. | |
| 4,953,085 A | 8/1990 | Atkins | |
| 5,715,399 A | 2/1998 | Bezos | |
| 5,727,163 A | 3/1998 | Bezos | |
| 5,794,207 A | 8/1998 | Walker et al. | |
| 5,852,811 A | 12/1998 | Atkins | |
| 5,863,073 A | 1/1999 | Taskett | |
| 5,864,828 A | 1/1999 | Atkins | |
| 5,870,720 A | 2/1999 | Chusid et al. | |
| 5,870,721 A | 2/1999 | Norris | |
| 5,884,285 A | 3/1999 | Atkins | |
| 5,897,620 A | 4/1999 | Walker et al. | |
| 5,911,135 A | 6/1999 | Atkins | |
| 5,911,136 A | 6/1999 | Atkins | |
| 5,933,811 A | 8/1999 | Angles et al. | |
| 5,940,812 A * | 8/1999 | Tengel et al. | 705/38 |
| 5,960,411 A | 9/1999 | Hartman et al. | |
| 5,963,949 A | 10/1999 | Gupta et al. | |
| 5,999,924 A | 12/1999 | Bair et al. | |
| 6,003,024 A | 12/1999 | Bair et al. | |
| 6,006,225 A | 12/1999 | Bowman et al. | |
| 6,029,141 A | 2/2000 | Bezos et al. | |
| 2001/0056397 A1 * | 12/2001 | Kelly et al. | 705/38 |

OTHER PUBLICATIONS

Business Editors, "MGIC and M&I Become Major Partners in E-Commerce Mortgage Services Company," Sep. 2, 1999, Business Wire, p. 1 (3 pages total).*

Carrie Lee, "Online Lenders Retool Strategy As Rates Climb—Home-Refinancing Freeze Forces Firms to Hustle for First Time Buyers," The Wall Street Journal Interactive Edition, Feb. 28, 2000, p. 1 (3 pages total).*

(Continued)

*Primary Examiner* — Richard C Weisberger
(74) *Attorney, Agent, or Firm* — Moazzam & Associates, LLC

(57) ABSTRACT

This invention relates generally to a method and system by which mortgage customers are linked to their existing mortgage servicer via an improved Internet process for achieving a mortgage modification, by their existing mortgage servicing institution rather than by a mortgage refinancing with loss of the customer to another servicing institution.

6 Claims, 7 Drawing Sheets

(56) References Cited

OTHER PUBLICATIONS

Wayback Machine Internet Archieve http://web.archive.org/web/20010417202129/customersforever.com/retent.html Mar. 13, 2000.*

Anonymous, Call Center Will Help Firms Retain Customer, Origination News, New York: Nov. 1999.*

Rhonda L. Lipshutz, Giving Those Tired Old Sites a New Look Companies are doing more with Their Websites in a Bid to Head Off Customer Defections, Mortgage Technology, New York: May 2000.*

Bank United Partners with Customers Forever to Offer Online Mortgages and Mortgage Statements to Customer, PR Newswire, New York: May 2000.*

GHR Systems Provides Key Component of Customers Forever Solution; PremierWare Facilities Customers Forever's Focus on Retention, PR Newswire, New York: Jan. 2000.*

Customers Forever Takes Internet Loan 'Manufacturing' to Point-of-Sale for Mortgage Lenders, PR Newswire, New York: Nov. 2000.*

Loan Modification Secrets Uncovered, Miller, Peter G., http://realtytimes.com/rtnews/rtcpages/19990518_loanmodification.htm.

Seek mortgage modification only as a last resort, Samaad, Michelle, http://www.bankrate.com/brm/news/mtg/19980119.asp.

Cooley, Scott, Mortgages in 2005, citation unknown.

Miller, Peter G., Loan Modification Secrets Uncovered, http://realtytimes.com/rtnews/rtcpages/19990518_loanmodification.htm.

Seek Mortgage Modification Only As a Last Resort; http://www.bankrate.com/brm/news/mtg/19980119.asp.

* cited by examiner

METHOD FOR MORTGAGE CUSTOMER RETENTION

This application claims priority to U.S. Provisional Patent Application Ser. No. 60/204,853, filed May 17, 2000, the content of which is hereby incorporated by reference herein in its entirety into this disclosure.

TECHNICAL FIELD

This invention relates generally to a method and system by which mortgage customers are linked to their existing mortgage servicer via an improved Internet process for achieving a mortgage modification, by their existing mortgage servicing institution rather than by a mortgage refinancing with loss of the customer to another servicing institution.

BACKGROUND OF THE INVENTION

A mortgage customer is often under the misconception that contacting the entity which originated his or her present mortgage is the best entity to talk to regarding refinancing or continuing with the existing mortgage. Consumers interested in refinancing their existing mortgage often return to their mortgage broker or lender that the customer worked with to get his existing mortgage, instead of the mortgage servicer who has a vested interest in retaining the mortgage customer. The entity who originated the mortgage is only compensated if the mortgage customer refinances and has little or no knowledge of customer retention programs available from the customer's existing mortgage servicer. While several Internet sites on the World Wide Web offer online loans and mortgages they do not offer a connection for the mortgage customer with the customer's existing mortgage servicer. This invention uniquely connects the mortgage customer with its existing mortgage servicer via the Internet.

Many mortgage customers who are interested in refinancing visit local banks or mortgage broker companies looking for a better interest rate than their existing mortgage. This process can take days or weeks for the customer. This invention provides an expedited process by which the mortgage customer is linked to his existing mortgage servicer. The invention connects the mortgage customer to the specific department within the mortgage servicer's operation dedicated to retaining mortgage customers. This is accomplished via an extensive database that provides an expedited process by which the mortgage customer provides necessary information to the database, and the database processes the information and identifies the customer's mortgage servicer. The mortgage customer and mortgage servicer's dedicated customer retention department personnel are then made aware of each other via an Internet link and/or e-mail link. The servicer is given the opportunity to retain the customer by offering the customer valuable cost saving opportunities for the customer's present mortgage, a home equity loan, refinance options, mortgage modification and/or provide them with other products that the servicer offers. This allows the servicer to retain valuable customers, avoiding the expense of replacing their loan portfolios whenever there is a reduction in interest rates, at which time customers often seek lower rates from a third-party mortgage provider.

From a consumer's point of view, mortgage modification saves hundreds to thousands of dollars in refinancing fees which can be avoided since the basic transaction is preserved, albeit in modified form. The consumer is optionally provided with mortgage payment history and loan balance as well as being educated to mortgage modification programs offered by their present servicer. Links to other financial products, such as credit reports, bi-monthly payment programs, home equity loans and other related services are also available.

From a mortgage servicing institution perspective, mortgage modification saves the company the expense of replacing an existing good customer with a costly new customer. Through modification, the customer is offered the opportunity to save hundreds to thousands of dollars in refinancing fees and offers the ability to showcase additional products and cross-sale opportunities. This invention provides an opportunity for the mortgage servicer to be discovered by an existing customer in a way that is otherwise unavailable today.

SUMMARY OF THE INVENTION

In accordance with the present invention, there is provided a system and method by which a mortgage customer who is interested in refinancing their existing mortgage, obtaining a home equity loan, mortgage modification and/or other products offered by mortgage financing companies is identified and referred back to their existing mortgage servicer.

It is an object of this invention to provide a customer retention solution which links mortgage customers who are contemplating refinancing their mortgage with another lender back to their existing mortgage servicer, thus providing the servicer the opportunity to offer their customer valuable information about the customer's existing mortgage, a home equity loan, refinancing options, bi-weekly mortgage payments, mortgage modification and/or other products that the servicer offers.

It is another object of this invention to minimize or eliminate many of the refinancing fees typically associated with mortgage refinancing.

These and other objects of this invention will be evident when viewed in light of the drawings, detailed descriptions and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
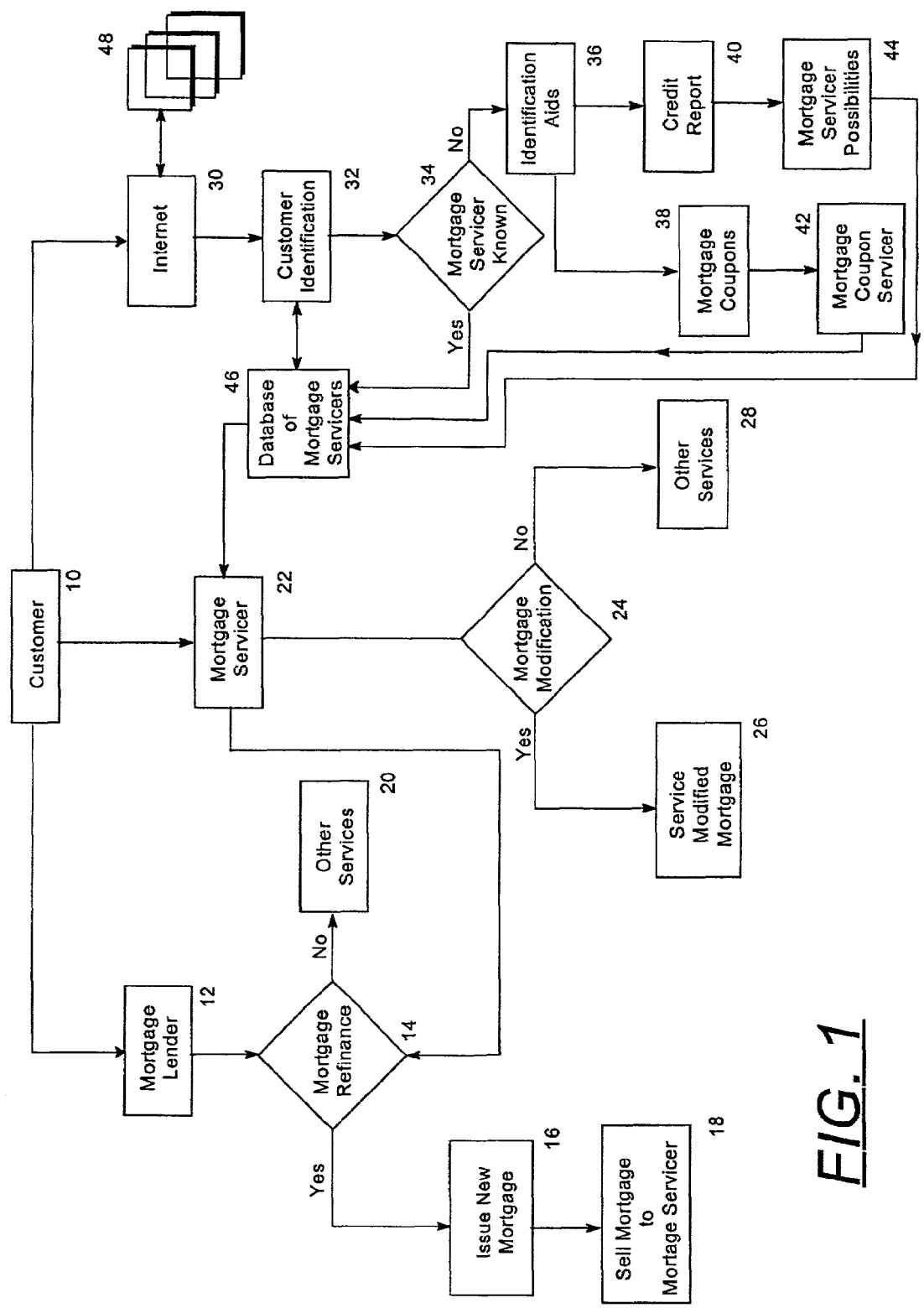
FIG. 1 is a block diagram flowchart showing the process by which mortgagee retention is effected through use of the website, identified in FIGS. 2-7.

Referring now to the drawings, wherein the showings are for purposes of illustrating the preferred embodiment of the invention only and not for purposes of limiting the same, the Figures show the sequence of possible steps taken by a user who is seeking better financial terms to an existing mortgage and how through utilization of the website, the existing mortgage servicer of that mortgage is positioned to retain that customer, rather than losing that same customer.

As best illustrated in FIG. 1, a consumer 10 who is in the market to refinance his mortgage, typically due to the fact that interest rates have dropped, has several options. The vast majority of homeowners return to their original lending institutions 12 and inquire about refinancing their mortgage 14. The lending institution makes financial decisions regarding this transaction based in large part on the credit report and other financial criteria of the customer. If the homeowner meets the criteria, then the lending institution will issue a new mortgage 16 with better financial terms from the perspective of the consumer. This loan is then typically sold to a mortgage servicing institution 18. If the homeowner does not qualify for a refinancing, he is typically referred to other financial services that the institution is offering 20. The critical point is that the current mortgage servicing entity has just lost a customer. Additionally, it is unlikely that the refinancing institution will sell the new loan to the same mortgage servicing institution, in that the refinancing consumer might very well question the value of the broker institution middleman.

Alternatively, the customer 10 could simply contact his existing mortgage servicing institution 22 directly. Once again, the mortgage servicing entity could refer the consumer to a mortgage lender for refinancing 14, or if authorized, could refinance the loan itself. However, from a consumer perspective, there is a value in being able to simply modify the existing terms of the loan, thereby saving on loan origination fees, surveys, title searches, etc. While mortgage modification has existed for quite some number of years, it is rarely used, primarily due to the fact that the average homeowner does not know the identity of his mortgage servicing institution or of the ability to modify the terms of the lending contract. Therefore, while the direct link between the customer 10 and his mortgage servicing institution 22 has always existed, the knowledge of the identity of this institution and its location have typically remained elusive. If however, the consumer was aware of this identity and was able to make contact with the institution, it has always been possible to modify the terms of the mortgage 24 through mortgage modification 26 provided that certain financial criteria are still met by the homeowner. Even if those criteria are no longer met by the customer, this contact with the institution offered the possibility of offering additional services to the customer 28.

In order to bridge the large gap between the identity of the mortgage servicing institution and the knowledge of the consumer, an Internet-based system was developed which facilitates eliminating this gap. With the prevalency of internet service providers, it is easy for consumers to access a web site 30 and begin the process of mortgage modification. The homeowner provides various personal indicia, eg., social security number, name, home address, etc., all of which is resident in an internal database 46. The website queries the consumer if he is aware of the identity of the mortgage servicing institution 34. If the answer is in the affirmative, the user's answer is compared to an internal listing of mortgage servicing institutions and if a match is found, the customer is requested for his authorization to contact his existing mortgage servicing institution 22, and to alert them to the possibility that an existing customer is about to be lost if he chooses the refinancing route.

If the homeowner does not know the identity of the mortgage servicing institution, then he is queried with a series of identification aids 36. One of these aids might be his mortgage coupon payment booklet 38, which at least identifies the coupon payment servicing entity 42, which may or may not be the mortgage servicing institution. However, knowledge of the coupon servicing entity is often sufficient to determine the precise identity, particularly with reference to the internal database which links coupon servicers with mortgage servicers. Alternatively, the consumer is offered the option of seeking a personal credit report 40, which would contain the name of the present mortgage servicer 44. Once again, even if this is not the precise name of the current mortgage servicer, the internal database will determine the correct identity of the mortgage servicing institution 22, with the ability to alert that institution of the need to initiate a customer retention activity after permission is secured from the customer.

In a fully automated system, the consumer would provide limited authority to the web site operator to obtain a credit report on behalf of the consumer and through electronically parsing the electronic report, i.e., electronically scanning the series of transmitted characters which comprise the credit report document, and looking for a series of sequential character matches, e.g., "Real Estate Loans" the web site operator is able to identify a limited number of possible mortgage servicing institutions and display the same on the computer screen for selection by the consumer. Once electronic permission is secured from the consumer, all or a subset of the identified mortgage servicing institutions are contacted to alert them to the need for a customer retention action to be initiated. One of the keys of the system is the ability of the system/software to match up consumer's current mortgage servicer with the information which has been provided by the consumer into the consumer database. The linking, typically electronically, of the consumer information in the consumer database with the mortgage service provider resident in the mortgage servicer database, is critical to enable the mortgage servicer to have the opportunity to at least initiate a customer retention program, an opportunity which is almost never possible today.

Therefore, what has been described is a process which includes the ability to match the present mortgage servicing institution with a mortgagee. The process includes a data processing system for entering the appropriate requested personal information concerning the consumer requesting mortgage amendment services or products and a processing unit to transfer certain detailed entries to all other consumer information databases within the system. The data entry system allows the user to access other parts of the system without repeating data entry of prior requested information. The data entry means also provides the user with interactivity to determine eligibility or suitability to the products and/or services presented.

With the foregoing overview in mind, the detailed operation of the system can best be understood by referencing FIGS. 2-7.

Figure 2:
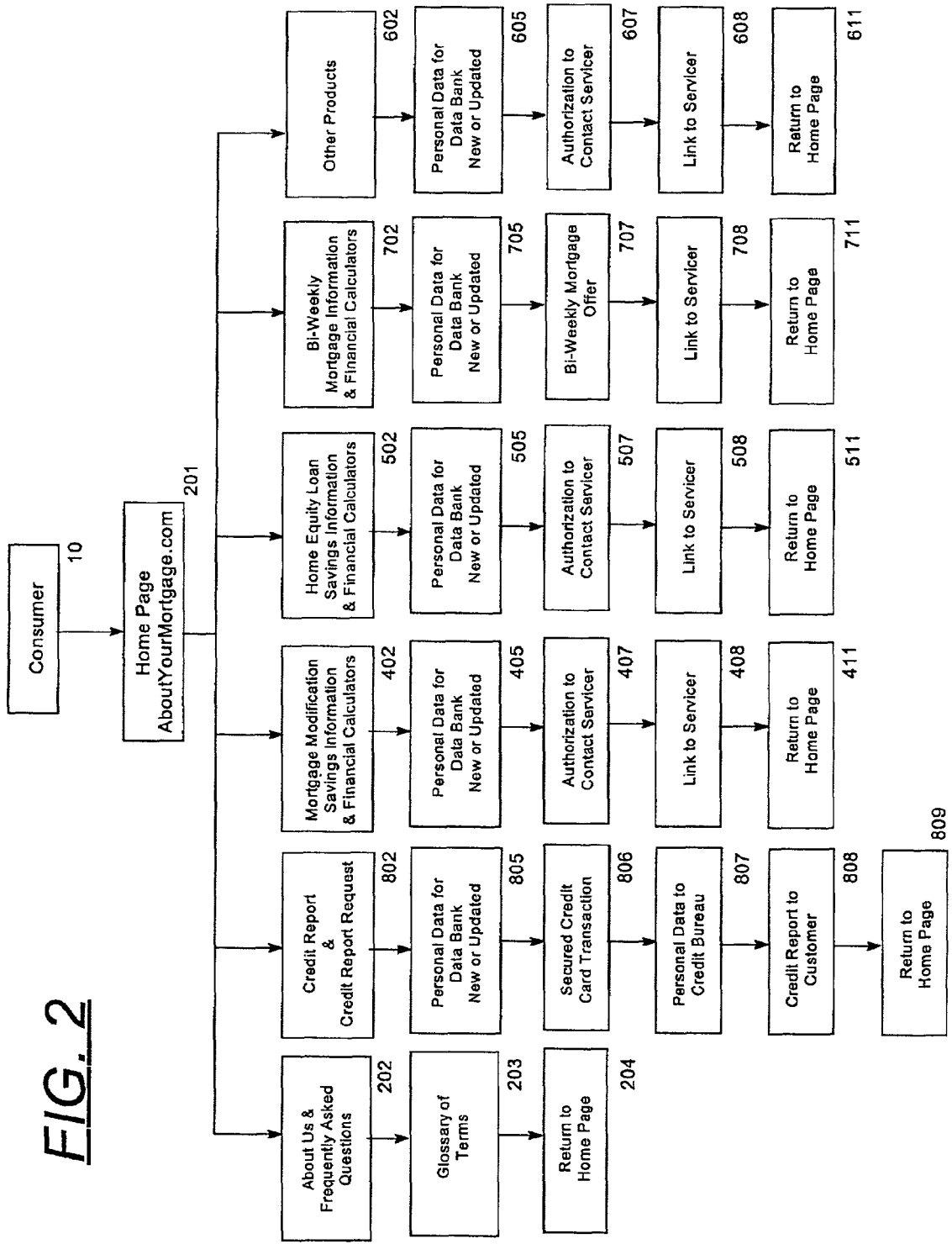
FIG. 2 is a block diagram flowchart depicting the overall methodology and structure of the input, database and response mechanisms.

Referring to FIG. 2, the consumer enters the Home Page 201 and is educated regarding the advantages of staying with their existing lender and then presented with a list of choices to direct the user to the appropriate area of interest. Simply wanting to know about the company, the user is directed to block 202, the About Us/Frequently Asked Questions area. This area is a static, non-interactive area and is not database responsive. If the user chooses block 402, Mortgage Modification, he is immediately internally linked to a section outlined in the block diagram of FIG. 4.

Figure 3:
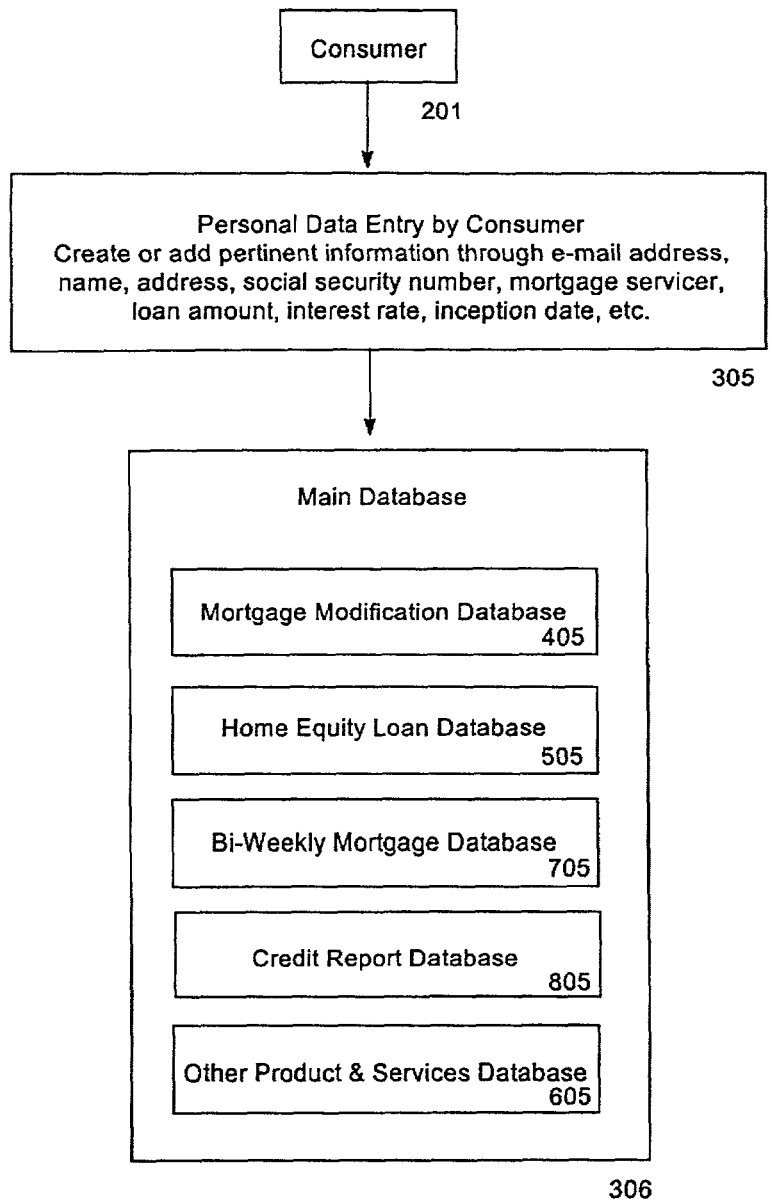
FIG. 3 is a block diagram exemplifying the input of data into the system and the respective responding and/or coordinating databases.
Figure 4:
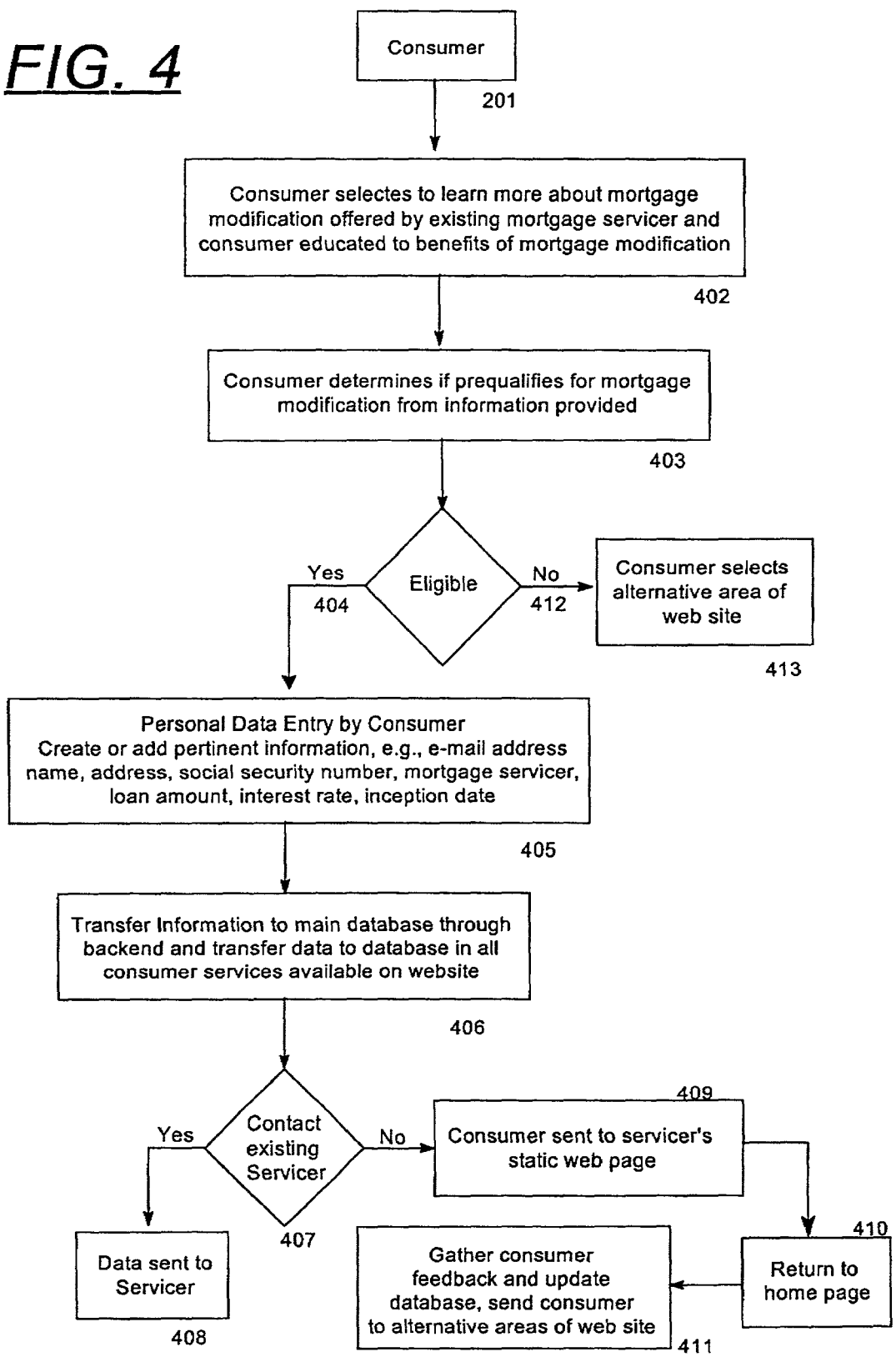
FIG. 4 is a schematic flowchart depicting the data entry and processing methodology and structure of that part of the invention which determines if the customer qualifies for a mortgage modification from their existing mortgage servicer and the routing and processing steps to be enabled, based on eligibility.

In this figure, the user learns specific information about mortgage modification and also its availability from his current mortgage servicer 402. At block 403, the consumer/user will enter information or answer a series of questions to help the user determine if this product or service is the one best suited for his needs. This input is then analyzed, and a response is provided to the user as to his eligibility for this product or service. At block 404, if eligible, user will be prompted to enter the necessary personal data at block 405 in order to continue processing. If this is the user's first entry into a database area of the website, the user will be required to enter all the data requested including, but not limited to, name, address, social security number, mortgage servicer, loan amount, inception date of the loan, term of the loan, and an e-mail address. The mortgage servicer is now electronically identified through a comparison match of the mortgage servicers identified in the database with the entry made by the consumer. At block 406, this information is then routed through the system and automatically placed in storage in each of the databases 405, 505, 705, 805, and 605 shown in FIG. 3. If user is entering this FIG. 3 area from another area of the website in which the user has entered the required data, then the required data is instantly available and only required new data will be added and transferred to the main data base.

Proceeding to block 407, authorization is given by the user to contact the existing mortgage servicer via internal links. At block 408, the system sends the pertinent data to the mortgage servicer and servicer is notified of consumer's request, thereby confirming that the user was routed by the website to the mortgage servicing institution. At Block 409, the system will route the user to an imbedded static or active website page that provides basic information about that servicer. After the static or active page has been visited, the consumer is returned to the main website, block 410, and then asked to input feedback, block 411, that will enter the main database to be transferred to an auto responder to send the user a confirmation e-mail. If the data inputted at block 403 is processed, analyzed and results in a determination that the user is not eligible, block 412, then the system directs the user to another part of the website, block 413.

Figure 5:
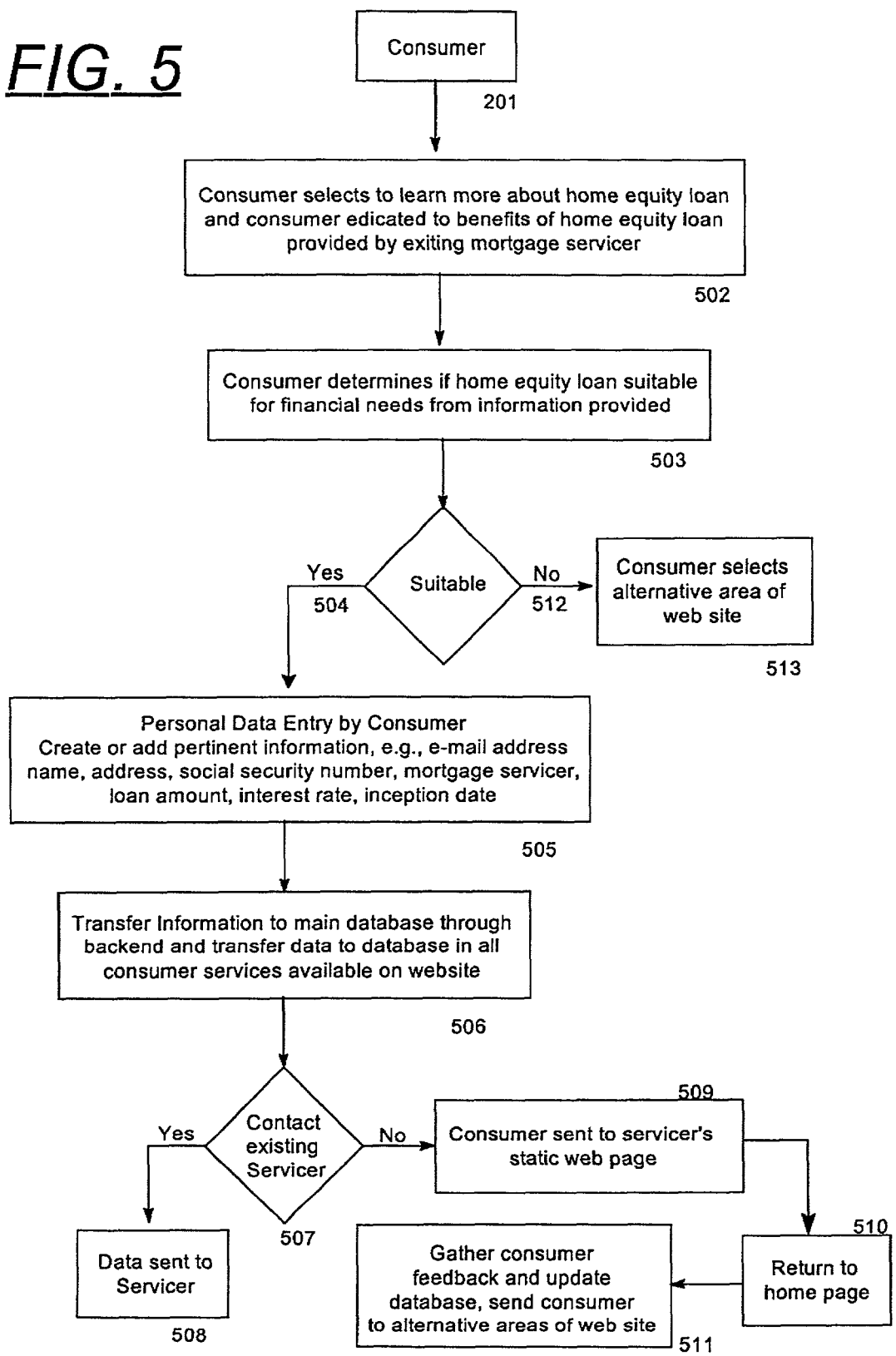
FIG. 5 is a schematic flowchart depicting the data entry and processing methodology and structure of that part of the invention which determines if the consumer is suitable for a home equity loan from their existing mortgage servicer and the routing and processing steps to be enabled, based on suitability.

At block 502 FIG. 5, the user leans specific information about a Home Equity Loan and also its availability from his current mortgage servicer. At block 503, the consumer/user will enter information or answer a series of questions to help the user determine if this product or service is the one best suited for his needs. This input is then analyzed and a response is provided to the user as to his suitability for this product or service. At block 504, if suitable, user will be prompted to enter the necessary personal data at block 505 in order to continue processing. If this is the user's first entry into a database area of the website, the user will be required to enter all the data requested including, but not limited to, name, address, social security number, mortgage servicer, loan amount, inception date of the loan, term of the loan, and an e-mail address. The mortgage servicer is now electronically identified through the database. At block 506, this information is then routed through the system and automatically placed in storage in each of the databases 405, 505, 705, 805, and 605 shown in FIG. 3. If user is entering this FIG. 5 area from another area of the website in which the user has entered the required data, then the required data is instantly available and only required new data will be added and transferred to the main data base.

Proceeding to block 507, authorization is given for the user to contact the existing mortgage servicer via internal links. At block 508, the system sends the pertinent data to the mortgage servicer and servicer is notified of consumer's request, thereby confirming that the user was routed by the web site to servicer. At block 509, the system will route the user to an imbedded static or active website page that provides basic information about that servicer. After the static or active page has been visited, the consumer is returned to the main website, block 510, and then asked to input feedback, block 511, that will enter the main database to be transferred to an auto responder to send the user a confirmation e-mail. If the data inputted at block 503 is processed, analyzed and results in a determination that the product is not suitable for the user, block 512, then the system directs the user to another part of the website, block 513.

Figure 6:
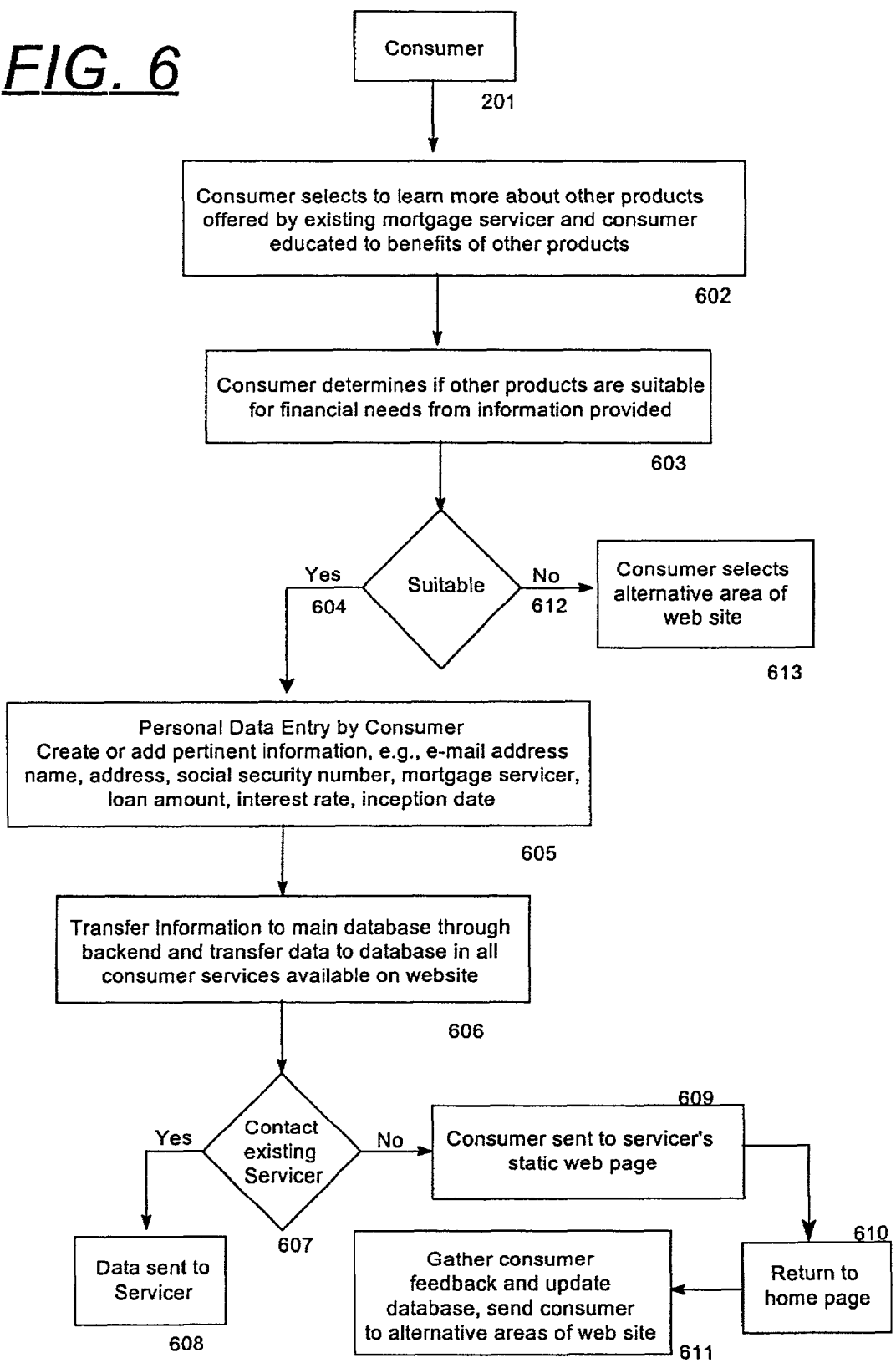
FIG. 6 is a schematic flowchart depicting the data entry and processing methodology and structure of that part of the invention which determines if the customer is suitable for any other products and/or services offered by their existing mortgage servicer and the routing and processing steps to be enabled, based on suitability.

At block 602 FIG. 6, the user learns specific information about Other Products & Services and also their availability from his current mortgage servicer. At block 603, the consumer/user will enter information or answer a series of questions to help the user determine if this product or service is the one best suited for his needs. This input is then analyzed and a response is provided to the user as to his suitability for this product or service. At block 604, if suitable, user will be prompted to enter the necessary personal data at block 605 in order to continue processing. If this is the user's first entry into a database area of the website, the user will be required to enter all the data requested including, but not limited to, name, address, social security number, mortgage servicer, loan amount, inception date of the loan, term of the loan, and an e-mail address. The mortgage servicer is now electronically identified through the database. At block 606, this information is then routed through the system and automatically placed in storage in each of the databases 405, 505, 705, 805, and 605 shown in FIG. 3. If user is entering this FIG. 6 area from another area of the website in which the user has entered the required data, then the required data is instantly available and only required new data will be added and transferred to the main database. Proceeding to block 607, authorization is given for the user to contact the existing mortgage servicer via internal links. At block 608, the system sends the pertinent data to the mortgage servicer and servicer is notified of consumer's request, thereby confirming that the user was routed by the web site to the servicer. At block 609, the system will route the user to an imbedded static or active website page that provides basic information about that servicer. After the static or active page has been visited, the consumer is returned to the main website, block 610, and then asked to input feedback, block 611, that will enter the main database to be transferred to an auto responder to send the user a confirmation e-mail. If the data inputted at block 603 is processed, analyzed and results in a determination that the product is not suitable for the user, block 612, then the system directs the user to another part of the website, block 613.

Figure 7:
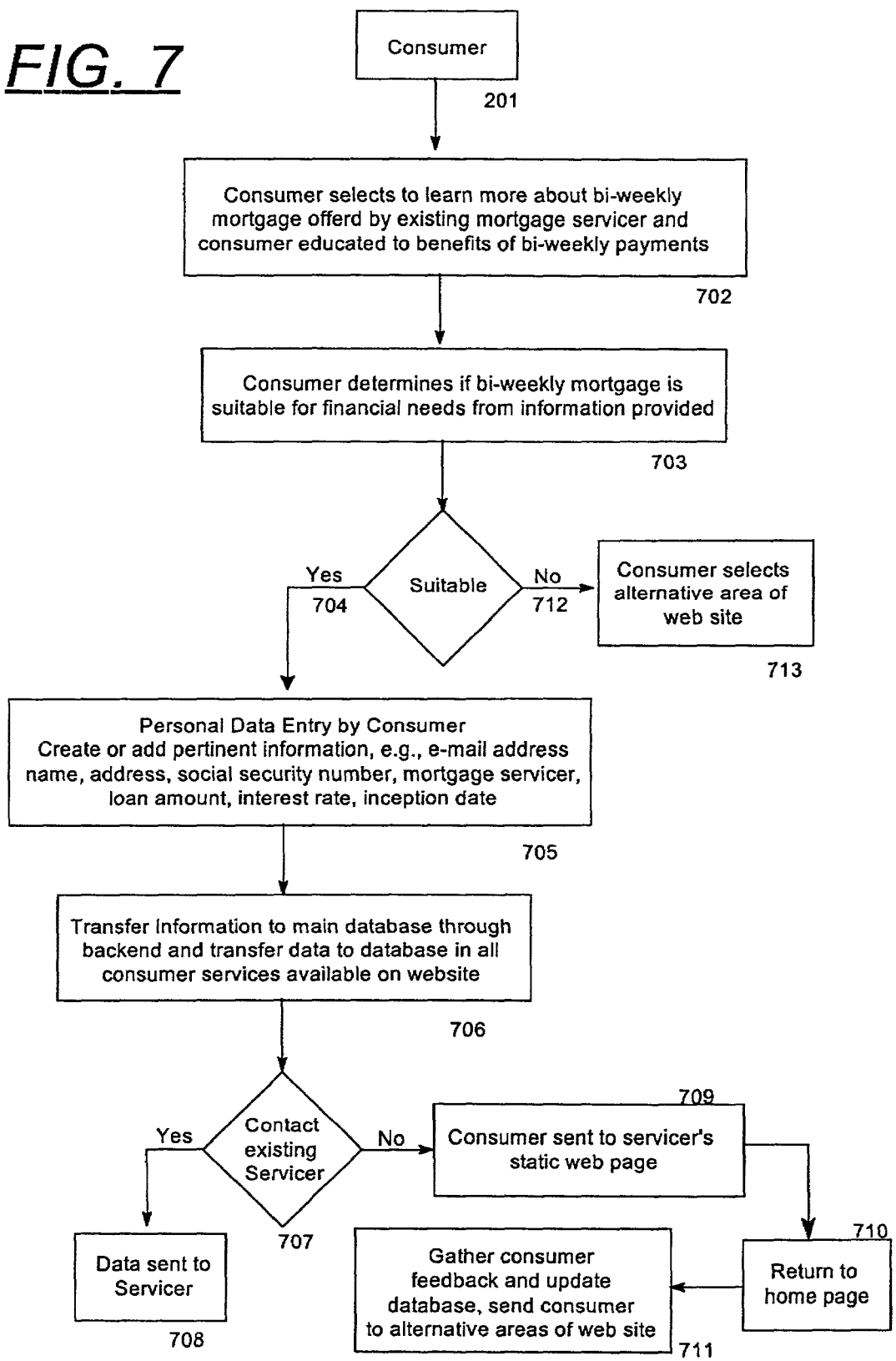
FIG. 7 is a schematic flowchart depicting the data entry and processing methodology and structure of that part of the invention which determines if the consumer is suitable for bi-weekly mortgage service offered by their existing mortgage servicer and the routing and processing steps to be enabled, based on suitability.

At block 702 of FIG. 7, the user learns specific information about Bi-Weekly Mortgage Payment Plans and their availability from his current mortgage servicer. At block 703, the consumer/user will enter information or answer a series of questions to help the user determine if this product or service is the one best suited for his needs. This input is then analyzed and a response is provided to the user as to his suitability for this product or service. At block 704, if suitable, user will be prompted to enter the necessary personal data at block 705 in order to continue processing. If this is the user's first entry into a database area of the website, the user will be required to enter all the data requested including, but not limited to, name, address, social security number, mortgage servicer, loan amount, inception date of the loan, term of the loan, and an e-mail address. The mortgage servicer is now electronically identified through the database. At block 706, this information is then routed through the system and automatically placed in storage in each of the databases 405, 505, 705, 805, and 605 shown in FIG. 3. If user is entering this FIG. 7 area from another area of the website in which the user has entered the required data, then the required data is instantly available and only required new data will be added and transferred to the main database. Proceeding to block 707, authorization is given for the user to contact the existing mortgage servicer via internal links. At block 708, the system sends the pertinent data to the mortgage servicer and servicer is notified of consumer's request, thereby confirming that the user was routed by the web site to the servicer. At block 709, the system will route the user to an imbedded static or active website page that provides basic information about that servicer. After the static or active page has been visited, the consumer is returned to the main website, block 710, and then asked to input feedback, block 711, that will enter the main database to be transferred to an auto responder to send the user a confirmation e-mail. If the data inputted at block 703 is processed, analyzed and results in a determination that the product is not suitable for the user, block 712, then the system directs the user to another part of the website, block 713.

At this point, the user will have the option of departing the website or, as shown in FIG. 2, find out more general information by entering via internal link to the section of the website dedicated to frequently asked questions and the corresponding answers, block 202. The other option, FIG. 2 block 805, enables the user to begin the process of ordering a personal credit report by entering into the database the required information including, but not limited to, name, address, social security number, mortgage servicer, loan amount, inception date of the loan, term of the loan, and an e-mail address. At block 805, this information is then routed through the system and automatically placed in storage in each of the databases 405, 505, 705, 805, and 605 shown in FIG. 3. If user is entering this area from another area of the website in which the user has entered the required data, then the required data is instantly available and will not be re-entered. Proceeding to block 806, personal charge card information is entered via a secure server and authorization is given for the credit card transaction to be processed and a credit report to be ordered. At block 807, the personal data entered into the system's database is then securely transmitted to the credit bureau with authorization to release a credit report to the user. At block 808, the web site has the credit report directly transmitted to the customer from the originating credit bureau without any direct involvement. At block 809, the user is returned via internal links to the Website Home Page or another area of the website determined by the user to be of interest.

Discussion

Therefore, what has been described in a best mode embodiment, can be more generally described as a process for mortgage customer retention by a mortgage servicing institution which includes at least the following steps:

(a) capturing pertinent user indicia information input by the mortgagee;

(b) identification of the mortgagee's mortgage servicing institution either through information input by the mortgagee or by using said input information to determine the mortgagee's mortgage servicing institution by comparison with a database of mortgaging servicing institutions;

(c) linking the mortgagee with the mortgagee's mortgage servicing institution by a comparison of the data input by the mortgagee based on various source, e.g., credit report, coupon payment booklet, direct knowledge, etc.; and (d) notification of the mortgage servicing institution, typically after securing permission of said mortgagee prior to notification of the mortgaging institution.

In an electronic environment, the mortgagee's credit report is electronically parsed, i.e., searching for character strings such as "Real Estate Loans" and capturing the adjacent number of ASCII text characters to the right of the search string. In one aspect of the invention, at least one of these identified mortgagee servicing institutions is displayed on the user's computer screen after the electronic parsing for selection by the consumer. In still one further embodiment of the invention, at least one of the mortgagee's mortgage servicing institution customer retention programs is initiated to enable the servicing entity to at least make contact with the potential lost consumer. Additionally, the consumer is often typically provided additional contact with the servicing entity through exposure to home equity loan options, refinance options, bi-weekly mortgage program options, and mortgage modification options.

In summary, the customer retention process works in that consumer's who are tempted to refinance their mortgages due to a reduction in mortgage rates are linked back to the present servicing institution. The identification of this entity is typically difficult in that many consumers do not know of the identity of this organization. The web site described previously facilitates this identification process by walking the mortgagee through a series of memory aids, e.g., customer coupon payment booklet, written communications from subsequent purchasers of the mortgage, consumer credit report, etc. When the credit report is the memory aid, the consumer typically authorizes the transaction to a credit reporting bureau and in one instance, receives an electronic report in the user's e-mail account for retrieval and viewing, or in a specialized embodiment, this report is electronically parsed to display various potential servicing institutions which are displayed on the web site. Through a comparison of the user entered indicia and the servicing entity identification, a link is made between two parties who potentially have never interfaced previously, and yet are in an existing customer/servicer relationship. Through authorization from the user, the web site completes the link between the potentially lost customer and existing servicing institution to enable that organization to use its customer retention capabilities so that a good customer is not lost when mortgage rates are reduced, and the customer achieves the goal of mortgage rate reduction through a mortgage modification rather than a mortgage refinancing.

This invention has been described in detail with reference to specific embodiments thereof, including the respective best modes for carrying out each embodiment. It shall be understood that these illustrations are by way of example and not by way of limitation.

What is claimed:

1. An Internet-facilitated process for retention of a borrower by a mortgage servicing institution, the process being stored on a server and inter-connected with one or more databases, the process comprising:
   (a) receiving user indicia information input through a web page and stored into a database by the borrower, the user indicia information being related to an existing mortgage associated with an existing relationship with the mortgage servicing institution and including a name, an address, a social security number, a loan amount, a date of the loan, and a term of the loan;
   (b) automatic and electronic comparison of the user indicia information with the one or more databases to identify the mortgage servicing institution, the one or more databases including a mortgage servicer database;
   (c) providing the borrower with specific information about an availability of a mortgage modification from the mortgage servicing institution;
   (d) providing the borrower with specific information about an availability of a home equity loan and other products and services related to the user indicia information from the mortgage servicing institution;
   (e) determining a suitability of the borrower with at least one of the mortgage modification, the home equity loan, and the other products and services; and
   (f) upon receiving a selection from the borrower, notifying the mortgage servicing institution of the suitability of the borrower with the at least one of the mortgage modification, the home equity loan, and the other products and services.

2. The process of claim 1 which further comprises
   (a) securing permission of said borrower prior to notification of said mortgage servicing institution.

3. The process of claim 2 which further comprises
   (a) identification of said borrower's mortgage servicing institution by a borrower's credit report.

4. The process of claim 3 which further comprises
   (a) electronically parsing said borrower's credit report to identify at least one of said borrower's mortgage servicing institutions.

5. The process of claim 1 which further comprises
   (a) displaying at least one of said borrower's mortgage servicing institution customer retention programs.

6. The process of claim 1 wherein
   (a) said customer retention programs further comprises at least one of:
      (i) home equity loan options,
      (ii) refinance options,
      (iii) bi-weekly mortgage program options; and
      (iv) mortgage modification options.

* * * * *